(12) United States Patent
Larkin et al.

(10) Patent No.: US 6,179,311 B1
(45) Date of Patent: Jan. 30, 2001

(54) REMOVABLE SPLASH GUARD ASSEMBLY FOR VEHICLES

(75) Inventors: Kenneth M. Larkin; Manuel P. Baptista, both of Redmond, OR (US)

(73) Assignee: Roadwing, Redmond, OR (US)

( * ) Notice: Under 35 U.S.C. 154(b), the term of this patent shall be extended for 0 days.

(21) Appl. No.: 09/129,987

(22) Filed: Aug. 5, 1998

Related U.S. Application Data

(63) Continuation-in-part of application No. 29/080,960, filed on Dec. 22, 1997.
(60) Provisional application No. 60/066,877, filed on Nov. 25, 1997.

(51) Int. Cl.[7] .................................................. B62D 25/18
(52) U.S. Cl. ........................................... 280/154; 280/851
(58) Field of Search .......................... D12/185; 280/154, 280/851, 847, 848, 155, 152.3, 506; 224/42.31, 519

(56) References Cited

U.S. PATENT DOCUMENTS

| | | |
|---|---|---|
| D. 249,500 | 9/1978 | Cox . |
| D. 328,447 | 8/1992 | Ahleen . |
| D. 415,086 * | 10/1999 | Larkin et al. ............... D12/185 |
| 4,138,130 | 2/1979 | Pickrell et al. . |
| 4,319,764 | 3/1982 | Whitaker . |
| 4,361,606 | 11/1982 | Butler et al. . |
| 4,487,422 | 12/1984 | Turunen . |
| 5,121,944 | 6/1992 | Haddox . |
| 5,316,191 * | 5/1994 | Gibson et al. . |
| 5,582,430 | 12/1996 | Bauer et al. . |
| 5,593,172 * | 1/1997 | Breslin ..................... 280/506 |
| 5,727,805 * | 3/1998 | La Roque . |
| 5,833,254 * | 11/1998 | Bucho ..................... 280/154 |
| 5,938,222 * | 8/1999 | Huang ..................... 280/154 |
| 6,076,842 * | 6/2000 | Knoer ..................... 280/154 |

FOREIGN PATENT DOCUMENTS 2 158 790   11/1985  (GB) .

* cited by examiner

Primary Examiner—J. J. Swann
Assistant Examiner—Christopher Bottorff
(74) Attorney, Agent, or Firm—Kolisch Hartwell Dickinson McCormack & Heuser

(57) ABSTRACT

A splash guard assembly having an attachment mechanism in the form of a collar. The collar is adapted to fit around a portion of a ball mount or receiver hitch of a trailer hitch. A generally horizontal extending structure is attached to the collar and has splash guards operationally attached to its distal ends. The generally horizontal extending structure can be an integral horizontal bar or a series of bars fixedly or adjustably disposed with respect to the collar. The generally horizontal extending structure can include bent portions allowing the splash guards to be connected to the structure at a different vertical position than that of the collar. The collar can be made of any design that allows a firm connection with the ball mount or receiver hitch. The attachment mechanism can alternatively take the form of a generally horizontal plate adapted to be attached to a bumper of the vehicle.

10 Claims, 4 Drawing Sheets

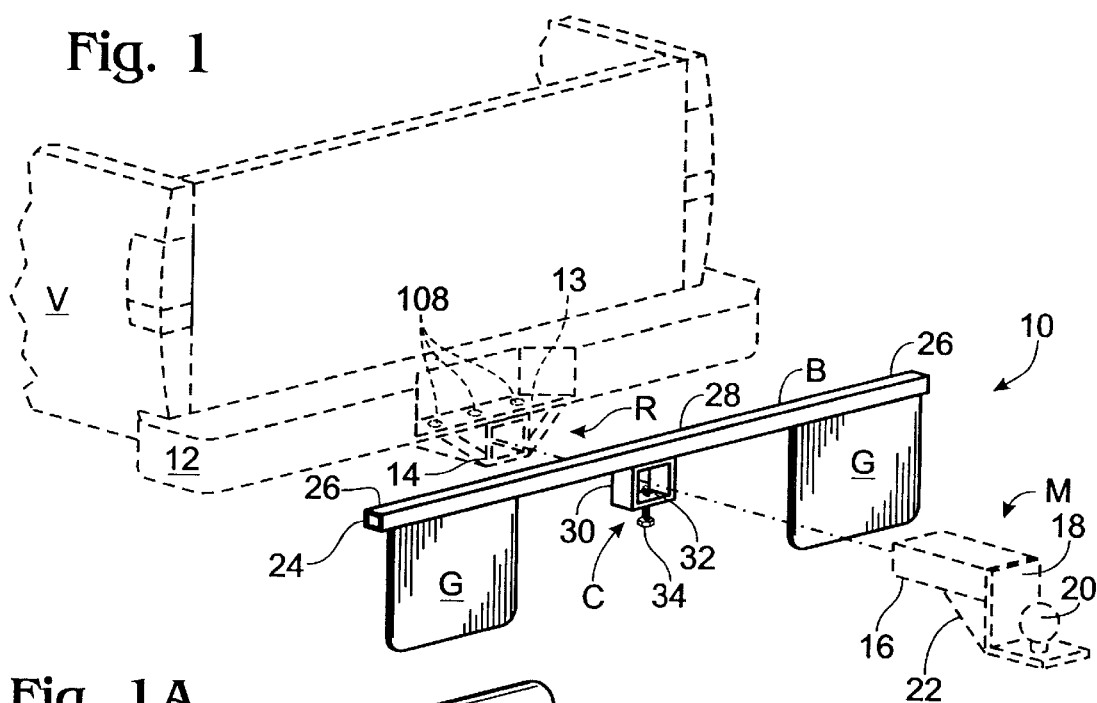
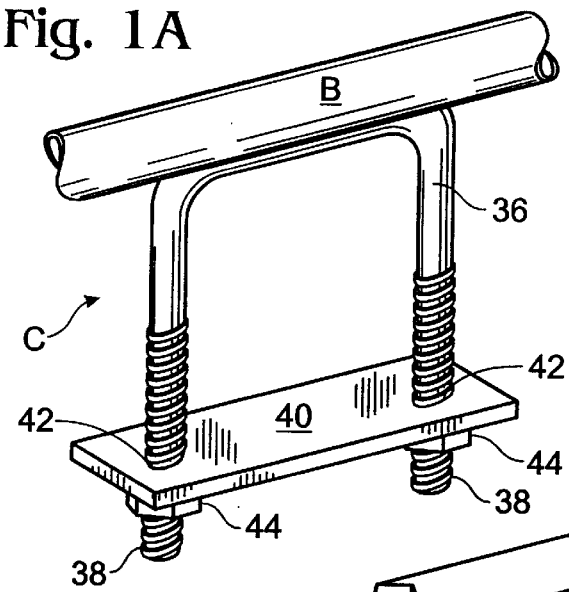
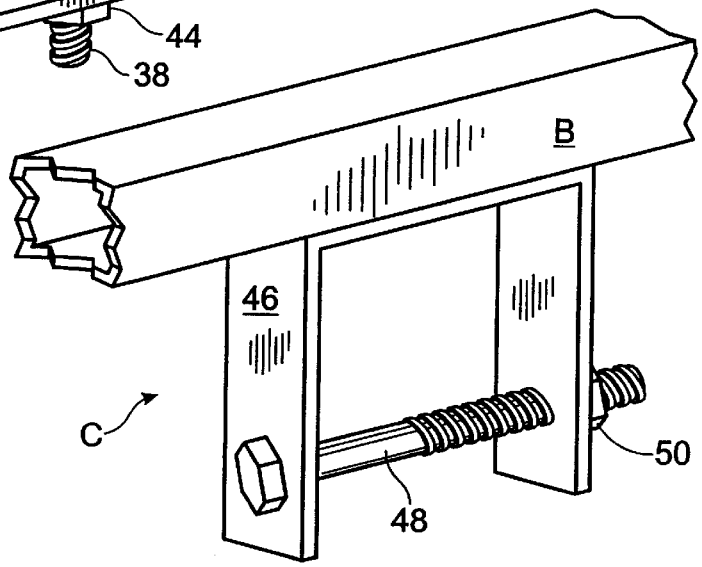

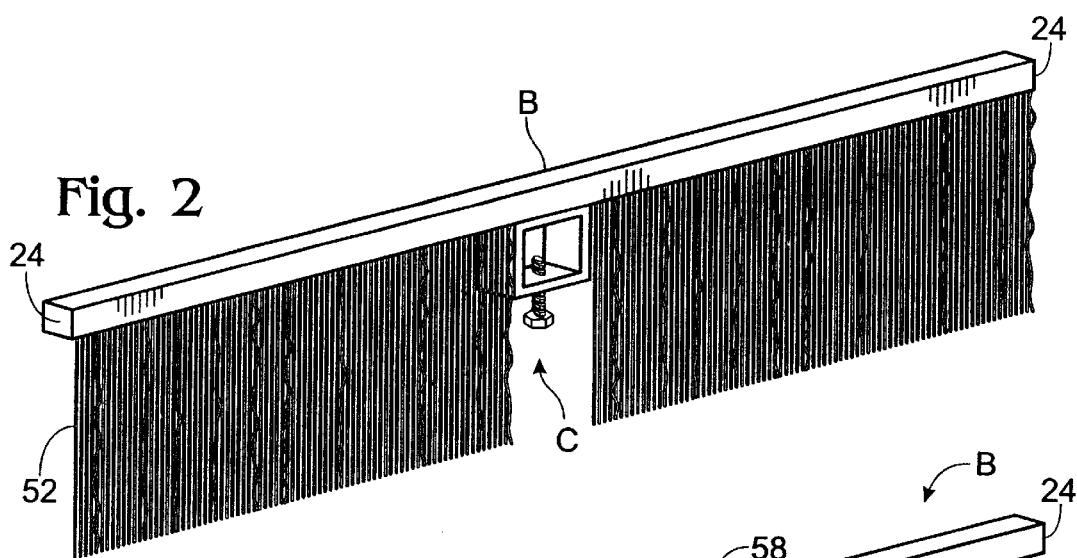
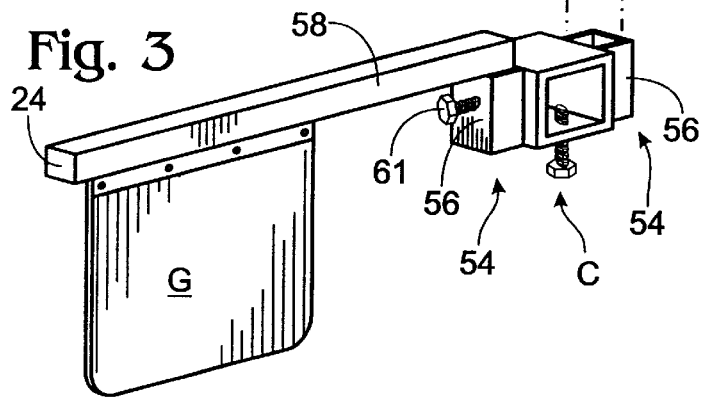
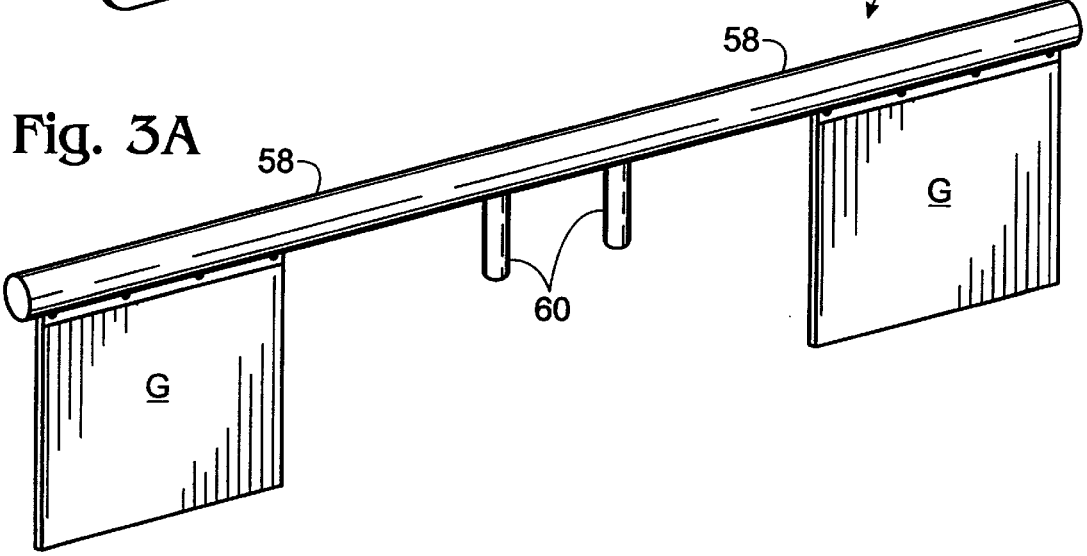

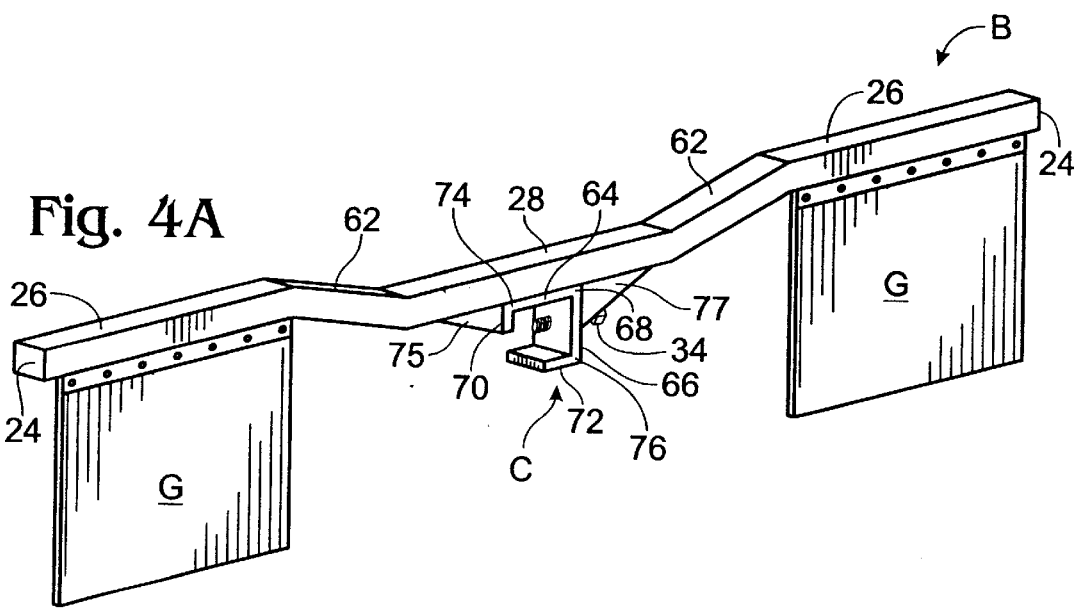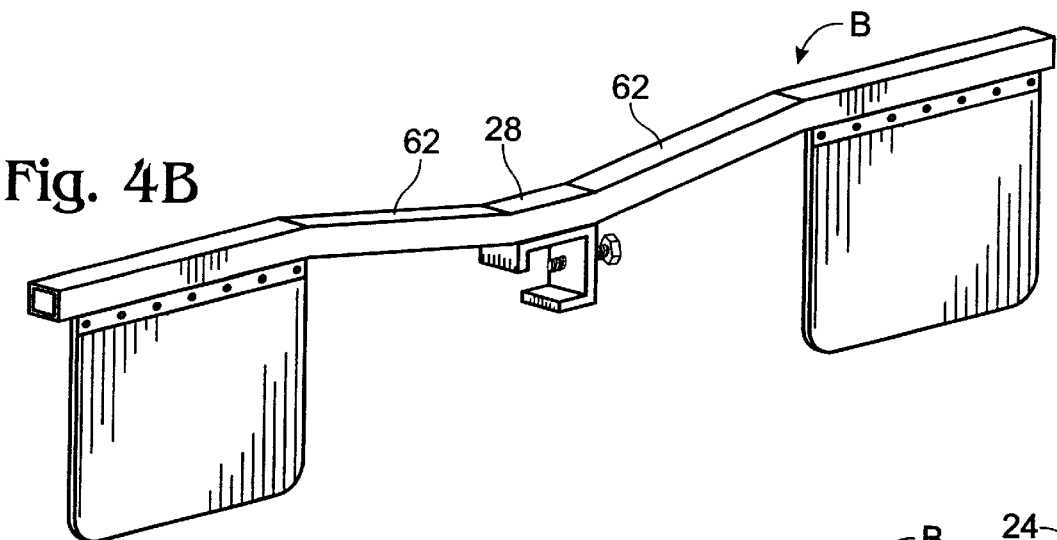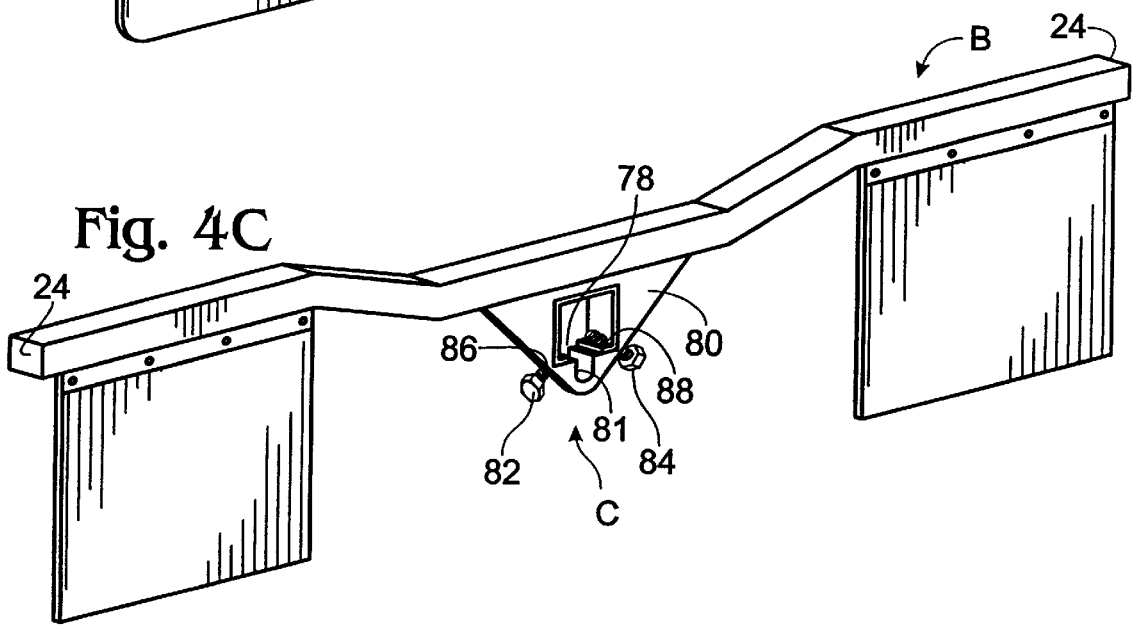

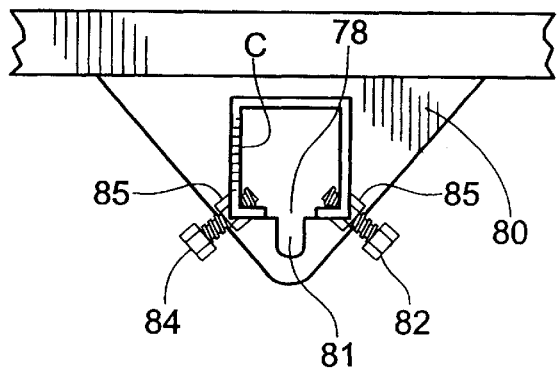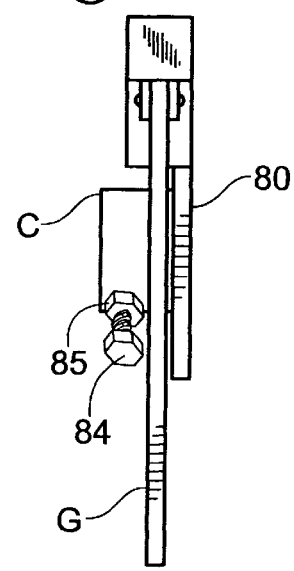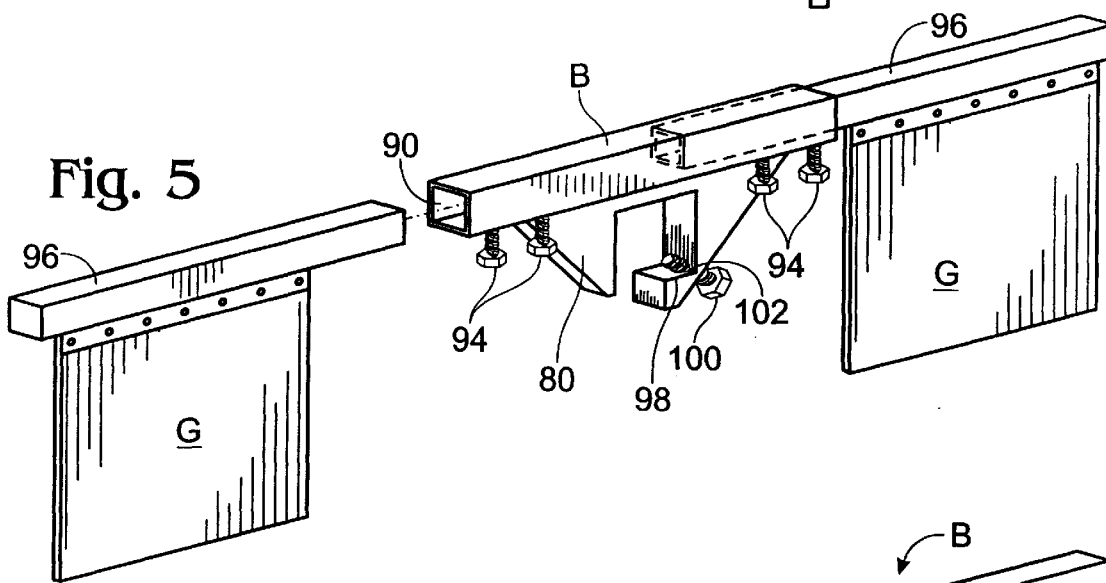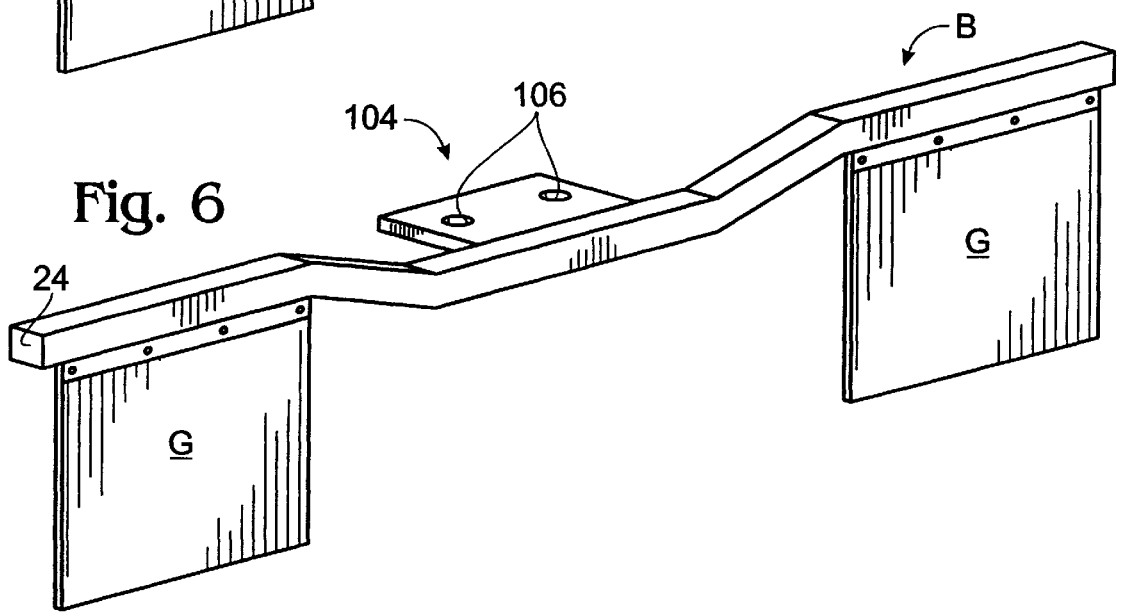

REMOVABLE SPLASH GUARD ASSEMBLY FOR VEHICLES

CROSS REFERENCE TO RELATED APPLICATION

This application claims priority to provisional patent Application Ser. No. 60/066,877 filed Nov. 25, 1997 titled "Removable Splash Guard Assembly for Vehicles," the disclosure of which is incorporated herein by reference in its entirety. This application is also a continuation-in-part of U.S. Design patent application Ser. No. 29/080,960, filed on Dec. 22, 1997, which is also hereby incorporated herein by reference in its entirety.

BACKGROUND AND SUMMARY OF THE INVENTION

The present invention is directed to a removable splash guard assembly for a vehicle. More particularly, the present invention is directed to a splash guard assembly for a vehicle that is removably mounted on a trailer hitch.

Splash guards are commonly provided on large trucks and trailers to prevent mist, rocks and mud from being thrown by the rotating tires of the truck. Smaller vehicles such as pickup trucks and sport utility vehicles also benefit from splash guards when towing a trailer. Splash guards help keep the trailer and the trailer's contents free from water mist, mud, and rocks that are picked up by the tires of the vehicle. However, many smaller vehicles are not equipped with splash guards. When a manufacturer does provide splash guards, they are often inadequate to protect the trailer and its contents.

Previous attempts to provide adequate splash protection for a vehicle such as a pick-up truck have typically involved permanently attaching splash guards to the frame, bumper, or undercarriage of the vehicle. These solutions are inadequate for use with a vehicle that only occasionally needs such splash protection.

The difficulties and problems found in past splash guard systems are overcome by providing a splash guard assembly having an attachment mechanism in the form of a collar. The collar is adapted to fit around a portion of a ball mount or receiver hitch of a trailer hitch. A generally horizontal extending structure is attached to the collar and has splash guards operationally attached to its distal ends. The generally horizontal extending structure can be an integral horizontal bar or a series of bars fixedly or adjustably disposed with respect to the collar. The generally horizontal extending structure can include bent portions allowing the splash guards to be connected to the structure at a different vertical position than that of the collar. The collar can be made of any design that allows a firm connection with the ball mount or receiver hitch.

Alternatively, the splash guard assembly can be adapted to be removably attached to the rear bumper of a vehicle. A connecting structure, preferably in the form of a horizontal plate, extends substantially orthogonally with respect to the horizontal bar. Holes are drilled into the plate that are coaxial with holes found in the step of a step-type bumper. Bolts or fasteners firmly connect the plate to the bumper. The connecting structure can be of any design that allows a firm connection with the bumper.

These and other objects, advantages and novel features of the invention will be set forth in part in the description which follows.

BRIEF DESCRIPTION OF THE DRAWINGS

FIG. 1 is a perspective view of one embodiment of the removable splash guard of the present invention, with the rear of a vehicle shown in dashed lines.

FIGS. 1A and 1B are perspective views of other embodiments of the present invention.

FIG. 2 is a perspective view of another embodiment of the present invention.

FIGS. 3 and 3A are perspective views of still another embodiment of the present invention.

FIGS. 4A, 4B, and 4C are perspective views of another embodiment of the present invention.

FIG. 4D is a detail view of the embodiment shown in FIG. 4C, and FIG. 4E is a side view of the embodiment shown in FIG. 4C.

FIG. 5 is a perspective view of yet another embodiment of the present invention.

FIG. 6 is a perspective view of yet another embodiment of the present invention.

DETAILED DESCRIPTION OF THE PREFERRED EMBODIMENTS

The drawings and the following description disclose several embodiments of the present invention. It will be understood that similar reference numbers in the different figures refer to similar parts of the invention.

FIG. 1 shows a removable splash guard assembly 10 of the present invention about to be mounted to the rear of a vehicle V. Vehicle V has a trailer hitch including a hitch receiver R disposed substantially flush with a rear bumper 12. Bumper 12 can be of the type known in the industry as a "step bumper" which has a generally horizontal step 13 disposed at the midpoint of bumper 12. Hitch receiver R can also extend rearwardly of bumper 12. Hitch receiver R has a hollow opening 14. The trailer hitch has a ball mount which includes a tube 16 adapted to fit in hollow opening 14. Ball mount M also has a vertical extension 18 upon which is disposed a ball 20. A gusset 22 extends between tube 16 and vertical extension 18.

Assembly 10 includes end caps 24 attached at the distal ends 26 of a generally horizontal extension structure, which in FIG. 1 takes the form of a bar B. Bar B can be hollow and has a square or rectangular cross-section. Alternatively, the cross-sectional shape of bar B can be circular or any other suitable shape. Splash protection elements in the form of mud flaps or guards G are attached at distal ends 26. Guards G can be made of rubber, plastic, heavy cloth, or a composite of materials as is known in the industry. An attachment mechanism in the form of a collar C is attached to bar B at a center region 28 of bar B. Collar C includes a hollow square sleeve 30 with a cross-sectional size sufficient to accept tube 16. Sleeve 30 has a threaded hole 32 disposed on the bottom of sleeve 30. A securing assembly in the form of a bolt 34 is threaded into hole 32. When tightened, bolt 34 presses against tube 16 and prevents movement of collar C with respect to tube 16. As shown in FIG. 4D, threaded hole 32 can be defined by a hole drilled into collar C with a nut 85 welded so the threaded hole of the nut is coaxial with the drilled hole. The securing assembly can also take other forms, such as a pin inserted into a hole in ball mount M, a friction-type lever-actuated clamp, or a contoured portion on the inside of collar C that contacts a contoured portion on tube 16.

To mount assembly 10 on vehicle, collar C is placed on tube 16 and bolt 34 is tightened so that collar C is secured to tube 16. Tube 16 is inserted into hollow opening 14 and attached to hitch receiver R using conventional methods. The trailer hitch is ready to be used. To remove assembly 10, tube 16 is detached and removed from hitch receiver R. Bolt 34 is loosened, and collar C is slid off tube 16.

The splash guard assembly of the present invention can also be mounted directly on hitch receiver R if hitch receiver R is not flush with bumper 12 but extends rearwardly of bumper 12. This arrangement allows assembly 10 to be mounted on vehicle V in the absence of ball mount M.

In some situations it may be desirable to mount assembly 10 on a trailer hitch when ball mount is already attached to hitch receiver. The embodiments shown in FIGS. 1A and 1B allow assembly to be mounted in such a situation. FIG. 1A shows an open-ended collar including a U-shaped bolt 36 threaded at both ends 38. A plate 40 has two holes 42 adapted to be inserted through threaded ends 38. Nuts 44 are threaded onto ends 38. Collar C is attached to bar B. Bar B is hollow and has a round cross-section. To mount assembly 10 on vehicle V, U-shaped bolt 36 is placed on tube 16 or on hitch receiver R. Plate 40 is placed on threaded ends 38, and nuts 44 are attached to threaded ends 38 and tightened until U-shaped bolt 36 and plate 40 are snug against tube 16. FIG. 1B shows a variation of the open-ended collar C. A U-shaped bracket 46 is attached to bar B. A bolt 48 is inserted through holes in bracket 46 when bracket 46 is placed on tube 16 or hitch receiver R. A nut 50 secures bolt 48 to bracket 46 when bracket 46 is mounted on hitch receiver R or ball mount M.

FIG. 2 shows another embodiment of the present invention in which the splash protection elements take the form of a plurality of strips 52. Each of strips 52 has a length substantially greater than its width. Strips 52 can be flexible or relatively rigid, or alternately strips 52 can comprise a combination of flexible and rigid individual strips.

FIG. 3 shows another embodiment of the present invention in which a bar mounting assembly 54 is attached to collar C. As shown in FIG. 3, bar mounting assembly 54 can take the form of two hollow tubes 56 having square cross-sections which are welded to the outer sides of collar. As with bar B, hollow tubes 56 can be of any suitable cross-sectional shape. The extension structure takes the form of two substantially identical extensions 58 upon which guards G are mounted. Extensions 58 can be separate from each other as shown in FIG. 3, or can be integrally connected to each other as shown in FIG. 3A. Each extension 58 has an angled end 60 adapted to fit into hollow tubes 56. Angled ends 60 preferably have a cross-sectional shape complementary to that of hollow tubes 56. For example, angled ends 60 in FIG. 3A have a generally round cross-sectional shape and are designed to be used with hollow tubes 56 having a generally round cross-sectional shape (not shown). Means, such as bolt 61, can be provided to secure angled ends 60 in hollow tubes 56 to prevent extensions 58 from inadvertently coming out of hollow tubes 56. Alternatively, collar C can be permanently attached to a hitch receiver R or ball mount M while extensions 58 are removably disposed on collar. The embodiments shown in FIGS. 3 and 3A allow guards G to be mounted and removed from vehicle V while collar C remains attached to hitch receiver R or ball mount M.

FIGS. 4A, 4B and 4C show another embodiment of the present invention that can be used where hitch receiver R or ball mount M are attached to vehicle V a distance below bumper 12. In this situation, a splash guard assembly of the present invention having a completely horizontal bar would be mounted low enough to allow water or rocks to pass between the top of the bar and the bottom of bumper 12. The embodiment shown in FIG. 4A provides guards G disposed vertically higher than the vertical position of collar C. Center region 28 and distal ends 26 of bar B are substantially horizontal. Bar also includes upwardly angled portions 62 connecting distal ends 26 to center region 28. Guards G are attached to distal ends 26. FIG. 4B shows a variation of this design in which center region is shorter than center region 28 in FIG. 4A. Angled portions can also be angled downwardly if it is desired to mount guards G vertically lower than the vertical position of collar C.

Embodiments of the present invention disclosed thus far have shown collar C as a hollow sleeve 30 adapted to completely surround ball mount M or hitch receiver R. However, some ball mounts are designed to be connected to a hitch receiver at a predetermined point along the tube of the ball mount. If gusset 22 is of substantial size, there may not be enough length of tube extending out of hitch receiver R upon which sleeve 30 can be attached. To overcome this potential problem, collar C can be configured so as not to interfere with gusset 22. As shown in FIGS. 4A and 4B, collar C has a "three-corner" design in which two complete sides 64, 66 of collar C are connected at a first corner 68. Two partial sides 70, 72, not necessarily having the same length, are respectively connected to the two complete sides 64, 66 at second and third corners 74, 76. Bolt 34 is disposed on one side of collar C. Brackets 75, 77 provide added attachment support between collar C and bar B. Collar C can be placed on tube 16 without interfering with gusset 22. Because collar C surrounds tube 16 at three corners 68, 74, 76, collar C does not move with respect to tube 16.

FIGS. 4C through 4E show another "gusset avoiding" design in which collar C has a generally square cross-section. Collar C has an opening 78 along the bottom side and is attached to a generally triangular plate 80. Plate is attached to bar B and, as best seen in FIG. 4E, is substantially thinner than collar C. Plate has a groove 81 disposed just below opening 78. Groove 81 and opening 78 are designed to accept part of gusset 22 when collar is placed on tube 16. The embodiment shown in FIGS. 4C through 4E is useful if gusset 22 is irregular in shape or if the cross-sectional width of gusset 22 increases as it approaches tube 16.

Bolts 82, 84 are rotatable in angularly disposed threaded holes 86, 88 at the lower corners of collar C. When collar C is inserted into tube 16, angularly disposed bolts 82, 84 firmly hold tube in both vertical and horizontal directions. Bolts 82, 84 are in a more convenient position to be loosened and tightened by an operator.

FIG. 5 shows a removable splash guard assembly according to the present invention in which the distance between guards G and collar C can be adjusted. Hollow bar B has a reduced length and two open ends 90. Screw bolts 94 are disposed in holes (not shown) in the underside of bar B. Extensions 96 are adapted to fit within hollow bar B. Guards G are attached to extensions 96. An operator slides each extension 96 within hollow bar B until guard G is at the desired distance from collar C. Screw bolts 94 are tightened to maintain each extension 96 at the desired distance.

FIG. 5 also shows another type of "gusset avoiding" collar design. Collar C is designed to surround tube 16 or hitch receiver R around three substantially complete sides. A partial side 98 extends from one of the complete side. Bolt 100 extends through an angularly threaded hole 102 in a lower corner of collar C. Collar C is integrally formed with triangular plate 80 which is attached to bar B.

FIG. 6 shows a further embodiment in which the attachment mechanism takes the form of a horizontal plate 104 welded to bar B. Plate 104 has holes 106 which are drilled to be coaxial with holes 108 in step 13 of rear bumper 12. Bolts or other suitable fastening means firmly hold plate 104 to bumper 12. The alternate form of attachment mechanism can be used if vehicle V has no trailer hitch that could mount the present invention.

The foregoing description of the preferred embodiments of the invention has been presented for purposes of illustration and description. It is not intended to be exhaustive or to limit the invention to the precise form disclosed, and many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A removable splash protection assembly for a vehicle, comprising:

a collar for connecting the assembly to a component of a trailer hitch on a vehicle, the collar having a bolt for securing the collar to the trailer hitch component, the bolt having a long axis and being inserted through a hole in a corner of the collar so that the long axis of the bolt is not parallel to any sides of the collar;

an extension structure connected to the collar; and a splash protection element operationally attached to the extension structure.

2. The removable splash protection assembly of claim 1, wherein the collar has a substantially rectangular cross-section, the collar surrounding the periphery of a portion of the trailer hitch component.

3. The removable splash protection assembly of claim 2, wherein the collar has a substantially square cross-section.

4. The removable splash protection assembly of claim 1, wherein the collar has three full sides attached to each other, each of the full sides having a length similar to the cross-sectional width of the trailer hitch component, the collar also including a partial side with a length equal to or less than a cross-sectional width of the trailer hitch component, the partial side and full sides connected to each other so that at least three corners of the trailer hitch component are surrounded by the collar.

5. The removable splash protection assembly of claim 1, wherein the collar has four sides that substantially surround the trailer hitch component, the collar further including a groove interrupting one of the four sides.

6. The removable splash protection assembly of claim 1, wherein the collar further includes a groove disposed along one side of the collar.

7. The removable splash protection assembly of claim 1, wherein the extension structure includes:

a bar having a generally horizontal portion and an angled portion;

wherein the collar and the splash protection element are attached to the bar at different vertical positions.

8. A removable splash protection assembly for a vehicle, comprising:

a collar for connecting the assembly to a component of a trailer hitch on a vehicle, wherein the collar has two full sides attached to each other, each of the full sides having a length similar to the cross-sectional width of the trailer hitch component, the collar also having two partial sides, each of the partial sides having a length equal to or less than a cross-sectional width of the trailer hitch component, the partial sides and full sides connected to each other so that three corners of the trailer hitch component are surrounded by the collar and one corner of the trailer hitch component is not surrounded by the collar;

an extension structure connected to the collar; and a splash protection element operationally attached to the extension structure.

9. The removable splash protection assembly of claim 8, wherein the collar further includes a groove disposed along one side of the collar.

10. A removable splash protection assembly for a vehicle, comprising:

an attachment mechanism for connecting the assembly to a component of a trailer hitch on the vehicle;

an extension structure connected to the attachment mechanism, the extension structure including a bar having a generally horizontal portion and an angled portion; and a splash protection element operationally attached to the extension structure, wherein the attachment mechanism and the splash protection element are attached to the bar at different vertical positions.

* * * * *